(12) United States Patent
Kim (10) Patent No.: US 11,630,322 B2
(45) Date of Patent: Apr. 18, 2023

(54) DAMPER AND ACTUATOR FOR CAMERA INCLUDING SAME

(71) Applicant: JAHWA electronics Co., Ltd., Chungcheongbuk-do (KR)

(72) Inventor: Hee Seung Kim, Seoul (KR)

(73) Assignee: JAHWA electronics Co., Ltd., Chungcheongbuk-Do (KR)

( * ) Notice: Subject to any disclaimer, the term of this patent is extended or adjusted under 35 U.S.C. 154(b) by 0 days.

(21) Appl. No.: 17/435,454

(22) PCT Filed: Jul. 9, 2020

(86) PCT No.: PCT/KR2020/008982
§ 371 (c)(1),
(2) Date: Sep. 1, 2021

(87) PCT Pub. No.: WO2021/010652
PCT Pub. Date: Jan. 21, 2021

(65) Prior Publication Data
US 2022/0163089 A1    May 26, 2022

(30) Foreign Application Priority Data

Jul. 17, 2019   (KR) .......................... 10-2019-0086065

(51) Int. Cl.
*G02B 27/64*       (2006.01)
*G03B 5/00*        (2021.01)
(Continued)

(52) U.S. Cl.
CPC ............. *G02B 27/646* (2013.01); *G02B 7/09* (2013.01); *G03B 5/00* (2013.01); *G03B 13/36* (2013.01);
(Continued)

(58) Field of Classification Search
None
See application file for complete search history.

(56) References Cited

U.S. PATENT DOCUMENTS 10,890,781 B2 * 1/2021 Zhang ..................... G02B 7/02
2011/0262121 A1 10/2011 Yanagisawa et al.
(Continued)

FOREIGN PATENT DOCUMENTS

KR   10-2010-0129930 A   12/2010
KR   10-2012-0123883 A   11/2012
(Continued)

OTHER PUBLICATIONS

Office action dated Aug. 17, 2021 from Korean Patent Office in a counterpart Korean Patent Application No. 10-2019-0086065 (all the cited references are listed in this IDS.).
(Continued)

*Primary Examiner* — Derek S. Chapel
(74) *Attorney, Agent, or Firm* — The PL Law Group, PLLC (57) ABSTRACT

An actuator for a camera according to an embodiment includes a base having an inner space formed therein, a carrier provided inside the base and configured to move in at least one direction among an optical axis direction, a first direction perpendicular to the optical axis and a second direction perpendicular to the optical axis and the first direction; and a damper provided to the carrier or the base and configured to have a shape extending in two or more directions among the optical axis direction, the first direction and the second direction.

2 Claims, 5 Drawing Sheets

(51) Int. Cl.
  *G03B 13/36*     (2021.01)
  *G02B 7/09*      (2021.01)
  *H04N 23/68*     (2023.01)

(52) U.S. Cl.
  CPC ... *H04N 23/685* (2023.01); *G03B 2205/0007* (2013.01)

(56) References Cited

U.S. PATENT DOCUMENTS

| | | | | |
|---|---|---|---|---|
| 2015/0256727 | A1* | 9/2015 | Kim | G02B 7/006 348/208.12 |
| 2016/0313568 | A1* | 10/2016 | Ichihashi | G03B 17/02 |
| 2019/0033613 | A1* | 1/2019 | Takimoto | H04N 5/23287 |
| 2020/0351421 | A1* | 11/2020 | Park | H04N 5/23258 |

FOREIGN PATENT DOCUMENTS

| | | |
|---|---|---|
| KR | 10-2013-0062635 A | 6/2013 |
| KR | 10-2015-0047996 A | 5/2015 |
| KR | 10-2017-0051975 A | 5/2017 |
| KR | 10-2017-0071097 A | 6/2017 |
| WO | WO 2017/105010 A1 | 6/2017 |

OTHER PUBLICATIONS

International Search Report for PCT/KR2020/008982 dated Oct. 15, 2020.
Office action issued on Aug. 17, 2021 from Korean Patent Office in a counterpart Korean Patent Application No. 10-2019-0086065 (all the cited references are listed in this IDS.) (English translation is also submitted herewith.).

* cited by examiner

DAMPER AND ACTUATOR FOR CAMERA INCLUDING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/008982, filed Jul. 9, 2020, which claims priority to the benefit of Korean Patent Application No. 10-2019-0086065 filed in the Korean Intellectual Property Office on Jul. 17, 2019, the entire contents of which are incorporated herein by reference.

BACKGROUND

1. Technical Field

The present disclosure relates to a damper and an actuator for a camera including the same, and more particularly, to a damper capable of relieving multi-directional impacts and an actuator including the same.

2. Background Art

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens.

In addition, an optical image stabilization (OIS) function means a function of improving the sharpness of an image by adaptively moving the carrier having a lens in a direction to compensate for the shaking when the lens is shaken due to trembling.

Recently, a device or actuator that integrates AF and OIS functions is being used. In this case, a structure for moving an OIS carrier on which a lens is mounted in an X-axis direction and/or Y-axis direction perpendicular to an optical axis inside an AF carrier is implemented integrally with an AF structure. According to an embodiment, a structure in which a lens is mounted to the AF carrier and an OIS carrier provided outside the AF carrier moves in a direction perpendicular to the optical axis direction is also used.

Meanwhile, as the specifications of a camera module mounted to a mobile terminal increase, the weight and size of the lens itself are gradually increasing. Accordingly, the weight and size of the actuator that physically supports and drives the lens are also increasing, and furthermore, a moving distance (also, referred to as a stroke) by which the lens moves is designed to increase.

As the weight or moving distance of the actuator increases as described above, the amount of impact delivered to internal components of the actuator and the amount of physical impact between the internal components due to external collisions or shaking increases dramatically.

The internal components of the actuator have various structures and shapes and are made of heterogeneous materials such as plastics and metals. Thus, the amount of physical impact increases in the case of an actuator with specifications such as heavy weight, so the internal components may be worn, damaged, broken, or the like more easily and greatly.

In this way, when abrasion or damage occurs at the internal components, the possibility of malfunction increases by itself, and furthermore, foreign substances such as particles (particles, debris, etc.) separated from the internal components or the like are generated and scattered. In this case, the driving precision of each component is lowered, and bad pixels (dead pixels, etc.) are generated in a pickup device such as a CCD, which may significantly affect the image quality.

SUMMARY

The present disclosure is designed to solve the problems of the related art, and therefore the present disclosure is directed to providing an actuator, which may significantly reduce the occurrence of foreign substances caused by external impact or the like by drastically reducing the phenomenon of damage, abrasion, and the like between internal components simultaneously with further relieving the amount of impact delivered to the internal components of the actuator even if a heavy lens or the like is mounted.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an actuator for a camera, comprising: a base having an inner space formed therein; a carrier provided inside the base and configured to move in at least one direction among an optical axis direction, a first direction perpendicular to the optical axis and a second direction perpendicular to the optical axis and the first direction; and a damper provided to the carrier or the base and configured to have a shape extending in two or more directions among the optical axis direction, the first direction and the second direction.

Preferably, the damper of the present disclosure may be provided at an edge or vertex portion of the carrier and have a shape facing an inner side of the base or a case coupled to the base in two or more directions among the optical axis direction, the first direction and the second direction.

Further, the damper of the present disclosure may be provided at a vertex portion of the carrier and have a shape facing the inner side of the base or the case in all of the optical axis direction, the first direction and the second direction.

In addition, the carrier of the present disclosure may include an AF carrier configured to move in the optical axis direction, and an OIS carrier configured to move in the first and second directions, wherein the damper is provided to a carrier located at an outer side among the AF carrier and the OIS carrier.

Here, the OIS carrier of the present disclosure may be provided inside the AF carrier, the AF carrier may further include a stopper configured to prevent the OIS carrier from moving in the optical axis direction, and the damper may be provided at an outer edge or vertex portion of the stopper.

In this case, the damper of the present disclosure may be provided at a vertex portion of the stopper and have a shape facing an inner side of the base or a case coupled to the base in all of the optical axis direction, the first direction and the second direction.

More preferably, the damper may include a planar part perpendicular to the optical axis; a first part bent at an outer side of the planar part to extend downward; and a second part bent at another outer side of the planar part, located different from the first part, to extend downward.

In another aspect of the present disclosure, there is also provided a multi-directional damper provided to an actuator for a camera, which includes a base having an inner space formed therein, and a carrier provided inside the base and configured to move in at least one direction among an optical axis direction, a first direction perpendicular to the optical axis and a second direction perpendicular to the optical axis and the first direction, wherein the damper is provided to the carrier or the base and configured to have a shape extending in two or more directions among the optical axis direction, the first direction and the second direction.

According to a preferred embodiment of the present disclosure, it is possible to configure such that external shocks may be relieved or reduced together in a plurality of directions, and thus, particularly in an actuator to which a heavy lens is mounted, it is possible to minimize the influence of external shocks on internal components.

According to another preferred embodiment of the present disclosure, since the damper is configured to have a new structure capable of relieving or reducing shocks in all of three directions along which the clearance or movement of the carrier may occur due to an external shock or the like, the shocks may be relieved simply and effectively in all directions, and the efficiency of the assembly process may be further enhanced.

In addition, according to the present disclosure, since the physical collision, interference, wear, damage, or the like between the internal components of the actuator may be drastically reduced, it is possible to significantly reduce the occurrence of foreign substances due to the collision between the internal components, thereby further enhancing the driving accuracy of the actuator and further reducing problems such as generation of bad pixels due to foreign substances.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
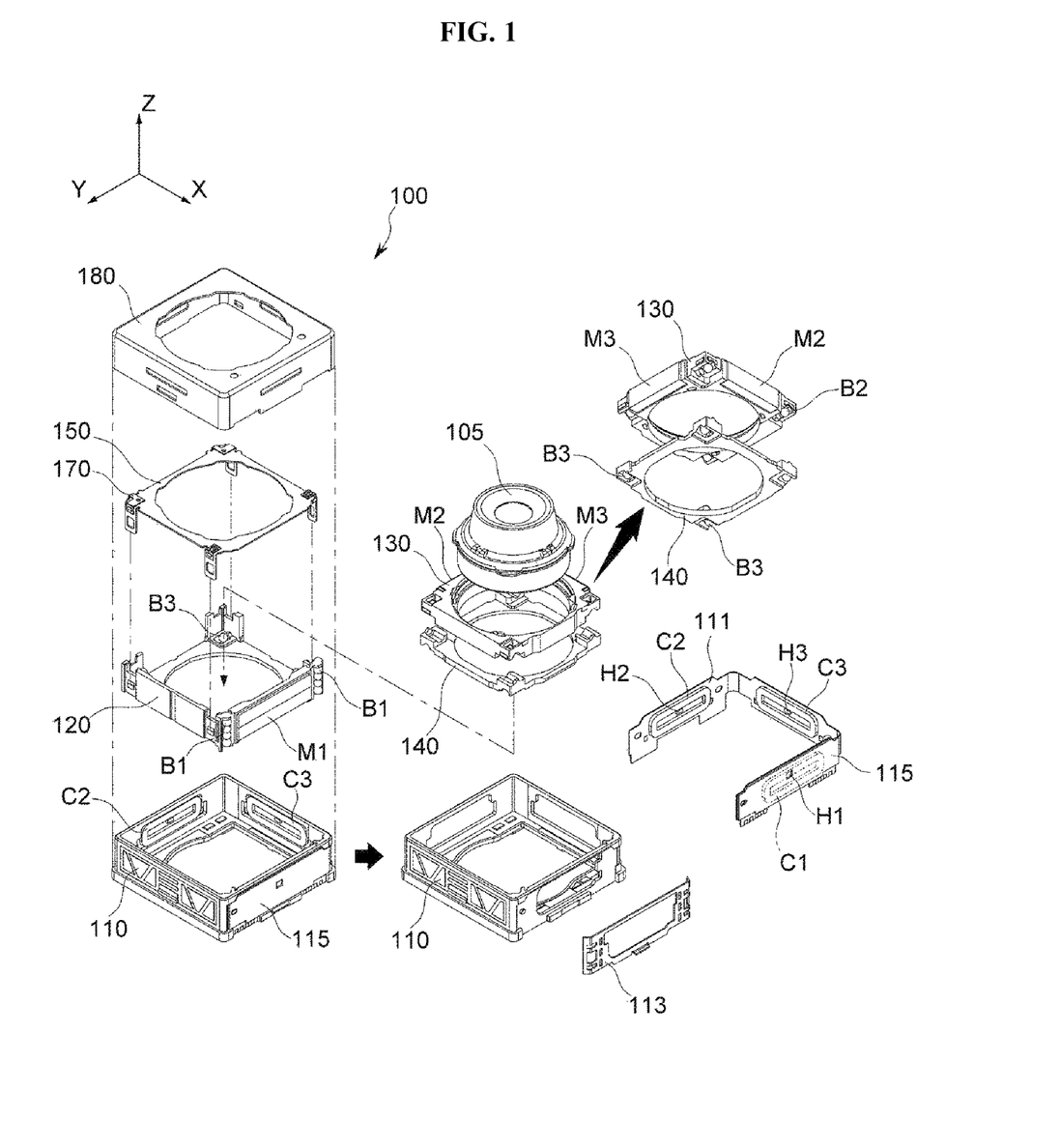
FIG. 1 is an exploded view showing the configuration of an actuator for a camera according to a preferred embodiment of the present disclosure.
Figure 2:
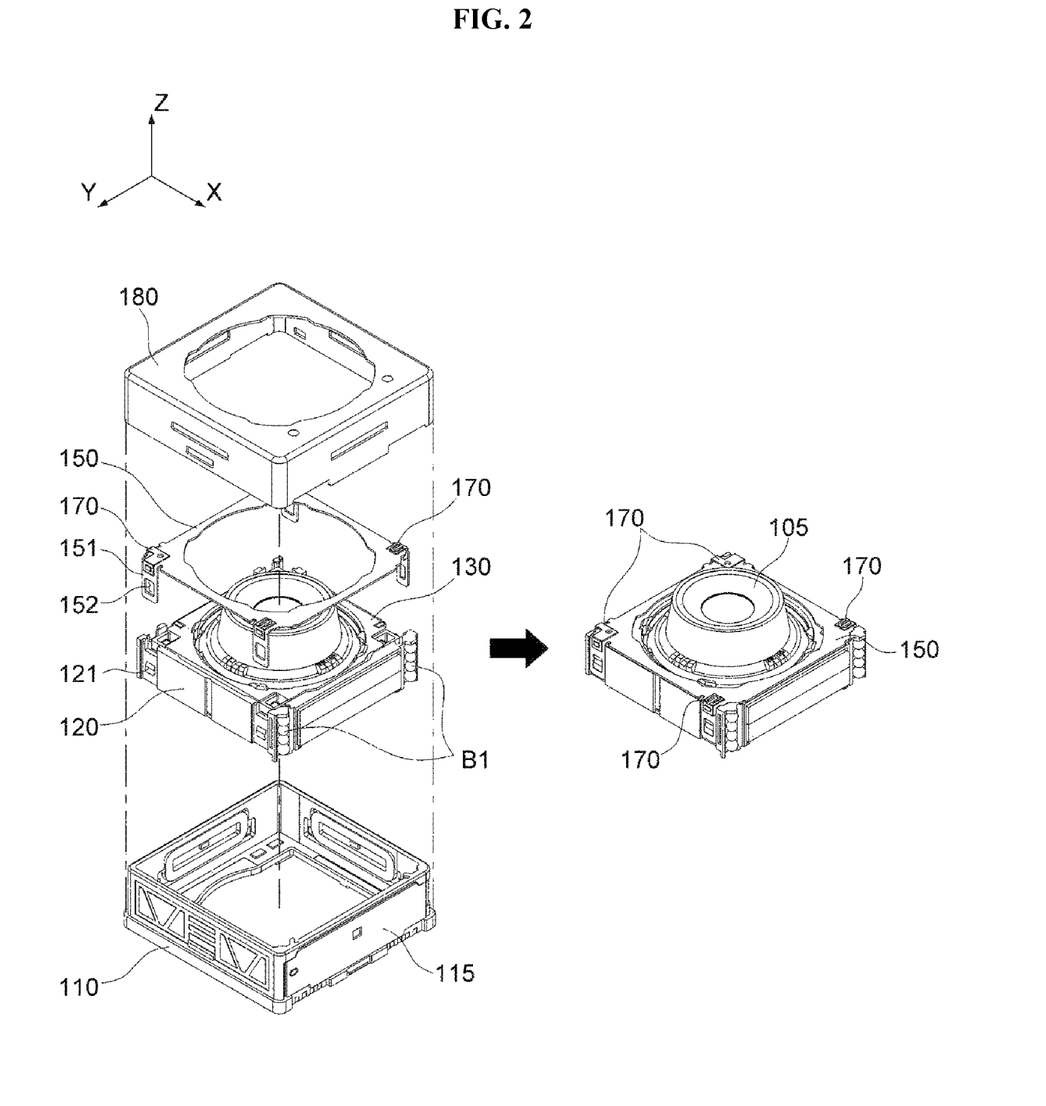
FIG. 2 is a diagram showing an internal structure of the actuator for a camera, depicted in FIG. 1.

FIG. 1 is an exploded view showing the configuration of an actuator 100 for a camera (hereinafter, referred to as an 'actuator') 100 of the present disclosure, and FIG. 2 is a diagram showing an internal structure of the actuator 100.

Hereinafter, the overall configuration of the present disclosure will be described first with reference to FIGS. 1 and 2, and the damper 170 of the present disclosure will be described in detail later.

Although the actuator 100 of the present disclosure shown in FIG. 1 is an embodiment in which both AF and OIS are implemented, the actuator 100 of the present disclosure may be implemented as an actuator only for AF or an actuator only for OIS depending on the embodiment.

As shown in FIG. 1, the actuator 100 of the present disclosure may include a lens 105, a base 110, an AF carrier 120, a first OIS carrier 130, a second OIS carrier 140, a stopper 150, a damper 170, and a case 180.

The Z-axis direction illustrated in FIG. 1 and the like is an optical axis direction in which light is introduced into a lens or a lens assembly 105, and corresponds to a direction in which the AF carrier 120 moves forward and backward.

If the AF carrier 120 moves forward or backward in the optical axis direction, the focal distance between a pickup device (not shown) such as a CCD (Charged-coupled Device) or CMOS (Complementary Metal-oxide Semiconductor) installed at a rear end of the actuator 100 and the lens 105 is adjusted, thereby implementing the auto-focus function.

Meanwhile, the X-axis direction and the Y-axis direction, which are two directions perpendicular to the optical axis direction (Z-axis direction), refer to directions in which the lens 105 moves by OIS operation to compensate for shaking caused by hand trembling.

In the following description, the X-axis direction is referred to as a first direction and the Y-axis direction is referred to as a second direction, but this is only an example according to a relative viewpoint, and any one of the X-axis direction and the Y-axis direction may be the first direction and the other direction may be the second direction.

As shown in FIG. 1, the actuator 100 according to an embodiment of the present disclosure has a structure in which the AF carrier 120, the second OIS carrier 140 and the first OIS carrier 130 are sequentially provided based on the base 110 functioning as a kind of housing. However, the order or structure of the carriers shown in the drawings is only one embodiment, and it is possible that the carriers are implemented in a different order or structure.

If a power of an appropriate magnitude and direction is applied to a first coil C1 provided to the base 110, a magnetic force is generated at a first magnet M1 provided in a direction to face the first coil C1, and by using the magnetic force as a driving force, the AF carrier 120 of the present disclosure moves forward and backward along the optical axis.

As shown in the figures, a first ball B1 arranged in the optical axis direction is provided between the base 110 and the AF carrier 120, and the AF carrier 120 of the present disclosure moves in the optical axis direction more precisely and flexibly with a frictional force minimized by the point of contact of the first ball B1.

A yoke 115 provided to the base 110 is made of a magnetic material such as metal to generate an attractive force with the first magnet M1. The AF carrier 120 of the present disclosure continues the point of contact with the first ball B1 while maintaining a certain distance from the base 110 by the attractive force between the yoke 115 and the first magnet M1.

At least one of the AF carrier 120 and the base 110 may have a guiding rail or a groove rail having a groove of a V-shaped or U-shaped section to prevent the first ball B1 from being separated and to effectively guide the linear movement of the first balls B1.

The first OIS carrier 130 of the present disclosure is a moving body that moves in the first direction (X-axis direction) perpendicular to the optical axis, and if the power of the appropriate magnitude and direction according to the reverse movement to compensate for movement such as hand trembling is applied to a second coil C2, a magnetic force is generated between the second coil C2 and a second magnet M2, and the first OIS carrier 130 of the present disclosure moves in the first direction by using the magnetic force as a driving force.

As shown in FIG. 1, between the lower portion of the first OIS carrier 130 and the upper portion of the second OIS carrier 140, a second ball B2 that physically supports the linear movement of the first OIS carrier 130 in the first direction by the point of contact is positioned.

As described above, at least one of the first OIS carrier 130 or the second OIS carrier 140 may have a guiding rail or a groove rail for guiding the linear movement of the second ball B2.

The reverse direction movement caused by hand trembling may be implemented by feedback control in which the position sensing of a hall sensor H2 using the hall effect and the application of power according thereto are cyclically applied. The feedback control may be applied to the linear movement of the AF carrier 120 (by applying a hall sensor H1), described above, and the linear movement of the second OIS carrier 140 (by applying a hall sensor H3), described later.

Each of the hall sensors H1, H2, H3 may be implemented as a single module, but it is also possible that the hall sensors are implemented as a single chip together with a driving drive that controls so that a power of an appropriate magnitude and direction is applied to the coil by using a digital code or the like.

The second OIS carrier 140 of the present disclosure corresponds to a moving object that moves in the second direction to compensate for hand trembling generated in the second direction (Y-axis direction), like the first OIS carrier 130 described above.

If a power of an appropriate magnitude and direction to correct hand trembling in the second direction (Y-axis direction) is applied to a third coil C3, a magnetic force is generated between the third coil C3 and a third magnet M3, and the second OIS carrier 140 moves in the second direction by using the generated magnetic force as a driving force.

As shown in the figures, a third ball B3 is located between the lower portion of the second OIS carrier 140 and the upper portion of the bottom surface of the base 110, and a guiding rail or a groove rail for guiding the linear movement of the third ball B3 is formed at the lower portion of the second OIS carrier 140 or the upper portion of the bottom surface of the base 110.

In the embodiment shown in the figures, the third magnet M3 has a form in which the first OIS carrier 130 is mounted, and if a magnetic force is generated between the third coil C3 and the third magnet M3, the generated magnetic force generates an attractive force and a repulsive force F3 in the second direction (Y-axis direction) as a whole.

A guiding rail (groove rail) for guiding the second ball B2 positioned between the first OIS carrier 130 and the second OIS carrier 140 is formed at the lower portion of the first OIS carrier 130 and/or the upper portion of the second OIS carrier 140.

Since the guiding rail (groove rail) is formed to extend in the X-axis direction, namely in a direction perpendicular to the Y-axis direction, even if the repulsive force F3 is generated, the first OIS carrier 130 itself does not move based on the second OIS carrier 140.

That is, the repulsive force F3 is generated, the second OIS carrier 140 and the first OIS carrier 130 mounted to the second OIS carrier 140 move in the second direction as a whole, and accordingly, the lens 105 mounted to the second OIS carrier 140 also moves in the second direction, thereby compensating for hand trembling of the lens 105 in the second direction.

The first coil C1, the second coil C2, the third coil C3 and the hall sensors H1, H2, H3 described above may be implemented to be mounted on one FPCB 111 as illustrated in the drawings.

The stopper 150 of the present disclosure is a component that is physically coupled to the AF carrier 120 as illustrated in FIG. 2 and the like, and after the first OIS carrier 130 and the second OIS carrier 140 are coupled to the AF carrier 120, the stopper 150 corresponds to a component that physically restricts the first OIS carrier 130 and the second OIS carrier 140 located at an inner side or an upper side of the AF carrier 120 not to move upward (based on the Z-axis).

As illustrated in FIG. 2, according to the embodiment, the stopper 150 may include legs 151 extending downward (based on the Z-axis) at a plurality of positions. In this case, the stopper 150 may be coupled to the AF carrier 120 such that a coupling groove 152 formed at the leg 151 and a coupling protrusion 121 formed at the side surface of the AF carrier 120 or the like are coupled to each other by fitting.

The stopper 150 may effectively suppress the first OIS carrier 130 or the second OIS carrier 140 not to be separated to the outside when an external impact or the like occurs, and furthermore may more effectively induce the linear movement of the first OIS carrier 130 and the second OIS carrier 140 in each direction.

As described above, according to an embodiment, the carrier of the present disclosure may be implemented as one of the AF carrier 120 moving in the optical axis, the first OIS carrier 130 moving in the first direction (X-axis direction) perpendicular to the optical axis, and the second OIS carriers 140 moving in the second direction (Y-axis direction) perpendicular to both the optical axis and the first direction, or a combination thereof.

The base 110 of the present disclosure has an inner space formed therein, and thus corresponds to a component that accommodates the carrier including one or more of the AF carrier 120, the first OIS carrier 130 and the second OIS carrier 140 therein. As shown in the figures, the present disclosure may include a case 180 coupled at the upper portion of the base 110 and implemented as a shield can that shields a magnetic force and the like.

In addition, the base 110 is usually made of a plastic material such as LCP (Liquid Crystal Polymer), PC, and the like and is manufactured by injection molding. Preferably, the base 110 may be configured such that, when a heavy lens 105 or the like is mounted thereto, a structural frame 113 such as a metal material is integrated thereto by insert injection or the like to improve physical rigidity or supporting force.

Although an example in which the structural frame 113 is provided in one side direction is shown in the figures, according to the embodiment, a plurality of structural frames 113 may be provided in a side direction, and furthermore, structural frames 113 may also be provided in a bent shape or the like at not only a bottom surface but also a side surface of the base 110 together.

The carrier (the AF carrier 120, the first OIS carrier 130, and the second OIS carrier 140) of the present disclosure is located in the inner space of the base 110 as described above and is physically moved inside the base 110, so there is a physically separated space between the base 110 and the carrier based on all of X-axis, Y-axis and Z-axis directions.

Hereinafter, the carrier forming a physically separated space from the base 110 will be described using the AF carrier 120 as an example, based on an embodiment in which the AF carrier 120 is located at an outermost side.

The damper 170 of the present disclosure is a component interposed in the separated space so that the effect of an external shock on the internal components is minimized, and may be provided to an outer side of the AF carrier 120 or an inner side of the base 110 or the case 180 coupled to the base 110.

In order to integrally implement the shock relieving structure in each direction and increase the efficiency of the assembly process, as described later, the damper 170 of the present disclosure is provided to the AF carrier 120 or the base 110 and is implemented to have a shape extending in two or more directions together among the optical axis direction (Z-axis direction), the first direction (X-axis direction) and the second direction (Y-axis direction).

Figure 3:
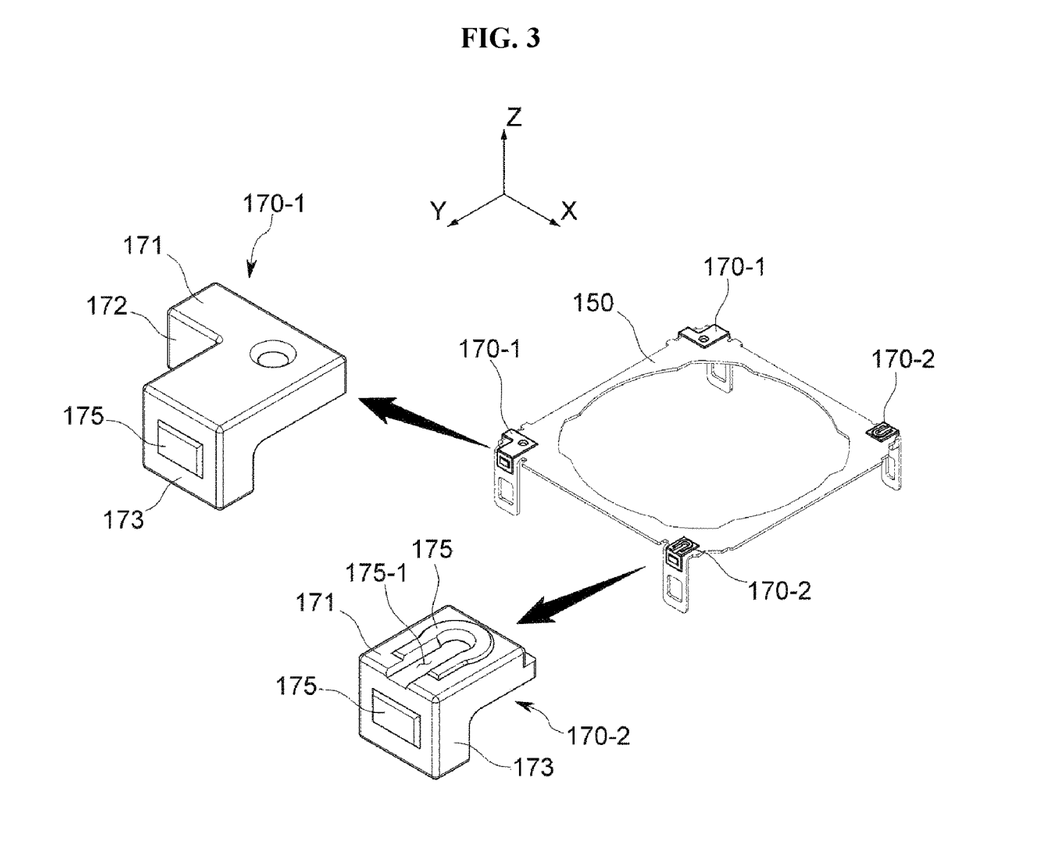
FIG. 3 is a diagram showing an embodiment of a damper installed at a stopper according to the present disclosure.
Figure 4:
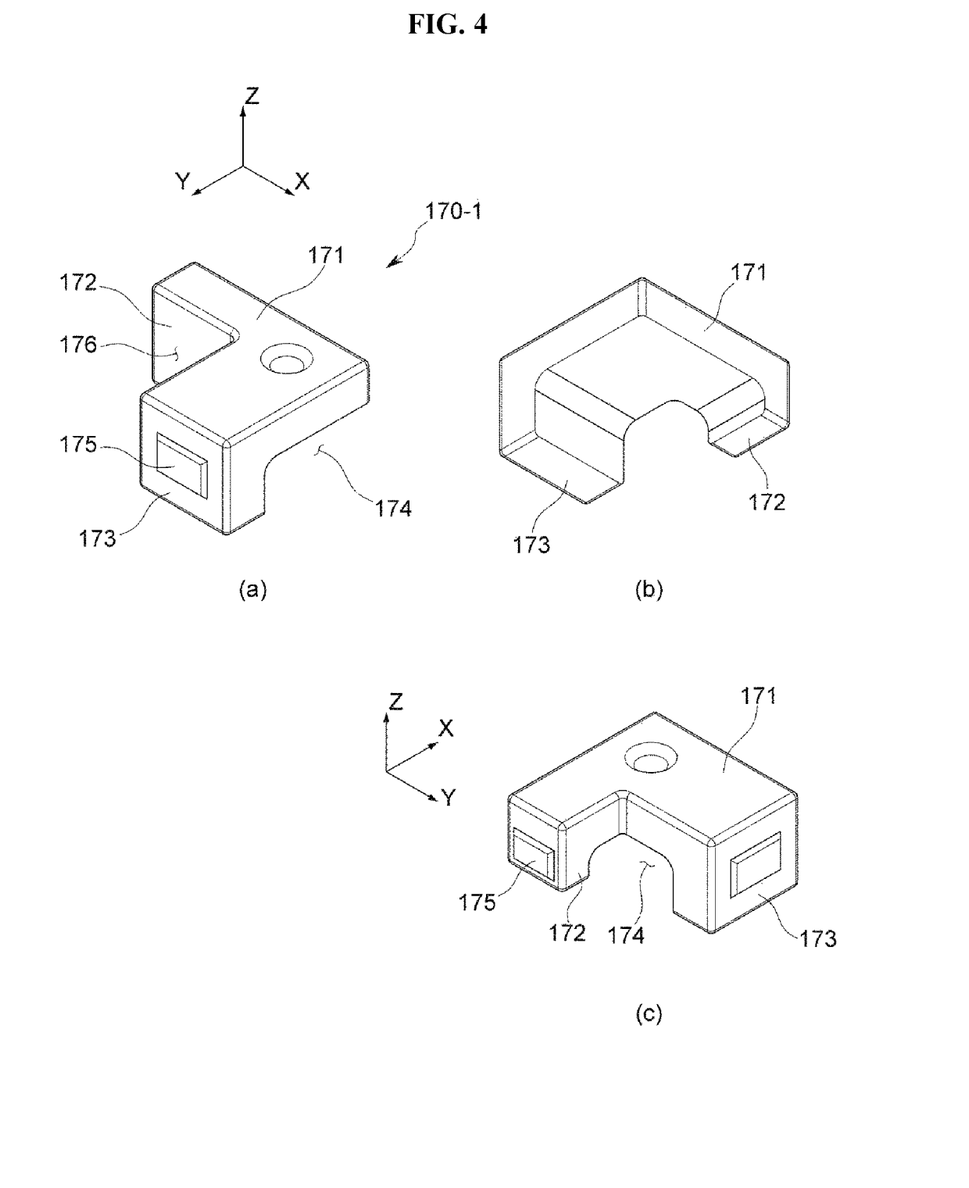
FIG. 4 is a diagram showing the configuration of a damper according to a preferred embodiment of the present disclosure.
Figure 5:
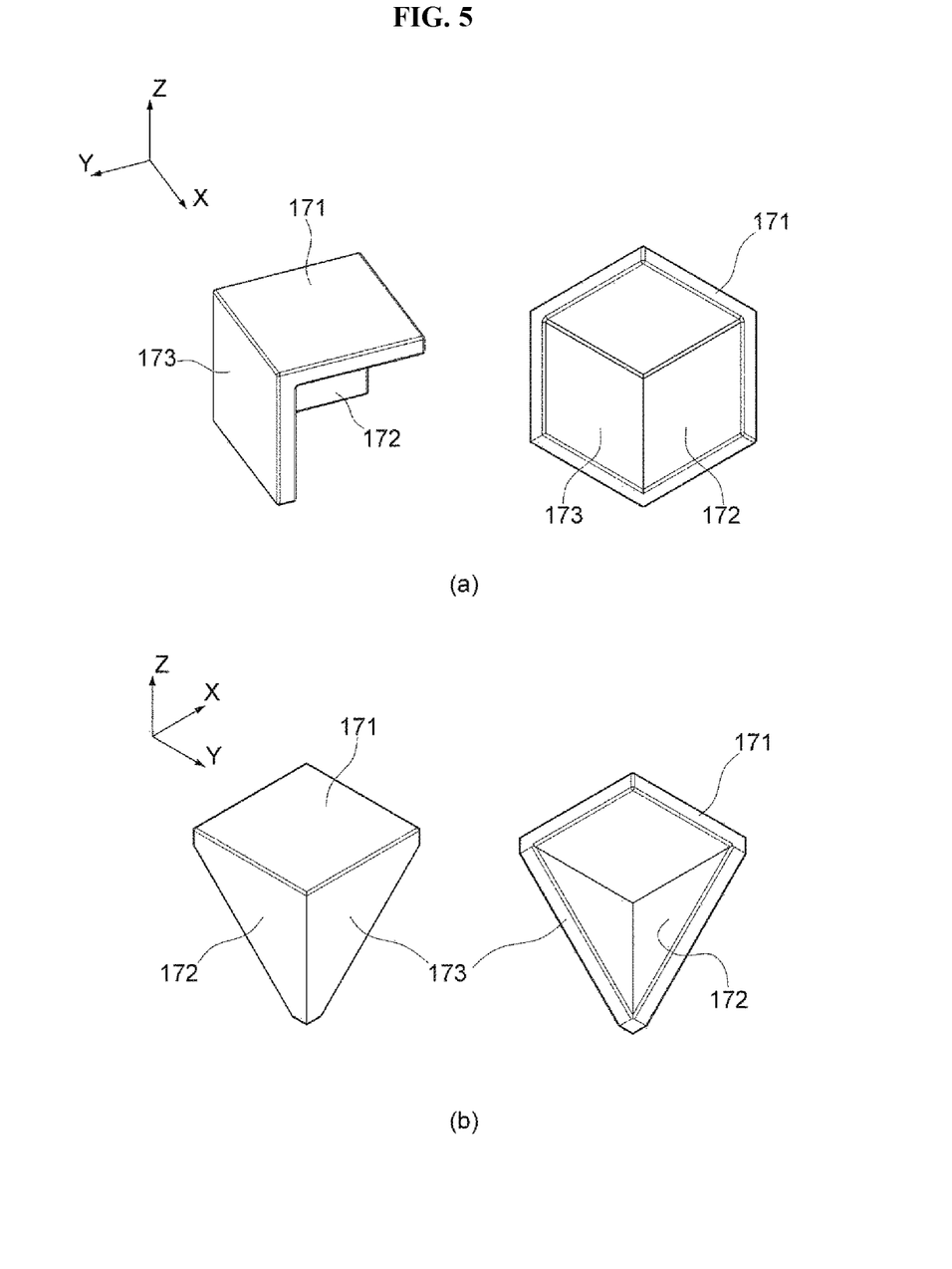
FIG. 5 is a diagram showing the configuration of a damper according to another preferred embodiment of the present disclosure.

FIGS. 3 to 5 are diagrams showing an embodiment of the damper 170 of the present disclosure. As shown in FIG. 3, the damper 170 of the present disclosure may be provided to the stopper 150 that is coupled to the upper portion of the AF carrier 120.

The damper 170 of the present disclosure described with reference to FIG. 3 is only taking a shape suitable to be provided to the stopper 150, and may also be provided to the carrier (AF carrier 120), the base 110, or the case 180 coupled to the base 110 through some changes such as an appropriate form or shape.

In FIG. 3, two types of dampers 170-1, 170-2 are exemplarily shown. The first damper 170-1 is provided at a vertex portion of the stopper 150 and is implemented in a structure capable of buffering in all of three directions (the optical axis direction, the first direction and the second direction), and the second damper 170-2 is provided at an edge portion of the stopper 150 and is implemented in a structure capable of buffering in two directions (e.g., the optical axis direction and the second direction).

The damper 170 illustrated in FIG. 3 is provided at an edge or vertex portion of the AF carrier 120 or the stopper 150 and has a shape facing an inner side of the base 110 or the case 180 coupled to the base 110 in two or more directions among the optical axis direction (Z-axis direction), the first direction (X-axis direction) and the second direction (Y-axis direction).

In particular, the first damper 170-1 is provided at the vertex portion of the stopper 150 or the AF carrier 120 and is configured to have a shape facing the inner side of the base 110 or the case 180 in all of the optical axis, the first direction and the second direction.

Specifically, the first and second dampers 170-1, 170-2 include a planar part 171 having a plane corresponding to the plane (X-Y plane) perpendicular to the optical axis in order to relieve the impact in the Z-axis direction as shown in FIG. 3.

In addition, the dampers 170-1, 170-2 includes a first part 173 having a shape bent at a position corresponding to the Y-axis direction in the outer side of the planar part 171 to extend downward, and the first damper 170-1 includes a second part 172 having a shape bent at a position corresponding to the X-axis direction in the outer side of the planar part 171 to extend downward.

In addition, preferably, at least one protrusion 175 or groove 175-1 is at the surface of each part 171, 172, 173 so that external shock may be absorbed or diffused more adaptively according to the magnitude of the applied external shock.

Physical specifications such as thickness or material of the protrusion 175 may be configured differently from the specifications of the body of the damper 170 so that such a step-by-step shock absorption may be implemented more effectively.

Since the damper 170 of the present disclosure has a structure in which a space 174 is formed as shown in FIG. 4, the damper 170 may be more easily placed at the edge or vertex portion of the stopper 150 or the AF carrier 120.

In addition, the damper 170 may be configured to have a margin space 176 formed between the first part 173 and the second part 172 so that the damper 170 is more adaptively coupled to the stopper 150 or the AF carrier 120 even w % ben other physical structures exist at the vertex portion or the like of the stopper 150 or the AF carrier 120.

As described above, the damper 170 of the present disclosure, particularly the first damper 170-1, is configured to have an integrated physical shape capable of buffering in all of the optical axis direction, the first direction and the second direction. Therefore, as long as this function is available, the damper 170 may be implemented in various shapes or structures, including the form illustrated in FIG. 5.

The damper 170 of the present disclosure is a kind of cushion member that relieves physical impact on the internal configuration, and may be made of a material such as rubber, silicone, foam rubber, PORON, and foamed resin to absorb shock or collision.

In addition, the damper 170 of the present disclosure may be provided to the stopper 150 or the like by a physical bonding method using a corresponding structure such as groove and protrusion or a chemical bonding method using application of an adhesive or the like, as well as by performing insert injection while the stopper 150 or the AF carrier 120 is manufactured.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first", "second", "upper" and "lower" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a camera, comprising:
   a base having an inner space formed therein;
   an autofocus (AF) carrier configured to move in an optical axis direction;
   an optical image stabilization (OIS) OIS carrier provided inside the AF carrier and configured to move in a first direction perpendicular to the optical axis and a second direction perpendicular to the optical axis and the first direction;
   a stopper configured to prevent the OIS carrier from moving in the optical axis direction and provided at the AF carrier; and
   a damper provided at an outer vertex portion of the stopper and configured to have a shape extending in the optical axis direction, the first direction and the second direction;
   wherein the damper includes:
      a planar part perpendicular to the optical axis;
      a first part bent at an outer side of the planar part to extend downward; and
      a second part bent at another outer side of the planar part, located different from the first part, to extend downward and being perpendicular to the first part,
   wherein the damper is configured to have a margin space formed between the first part and the second part.

2. A multi-directional damper provided to an actuator for a camera,
   wherein the actuator comprises:
      a base having an inner space formed therein;
      an autofocus (AF) carrier configured to move in an optical axis direction;
      an optical image stabilization (OIS) OIS carrier provided inside the AF carrier and configured to move in a first direction perpendicular to the optical axis and a second direction perpendicular to the optical axis and the first direction; and
      a stopper configured to prevent the OIS carrier from moving in the optical axis direction and provided at the AF carrier,
   wherein the multi-directional damper comprises:
      a planar part perpendicular to the optical axis;
      a first part bent at an outer side of the planar part to extend downward; and
      a second part bent at another outer side of the planar part, located different from the first part, to extend downward, and being perpendicular to the first part,
   wherein the multi-directional damper is configured to have a margin space formed between the first part and the second part; and
   the multi-directional damper is provided at an outer vertex portion of the stopper and configured to have a shape extending in the optical axis direction, the first direction and the second direction.

* * * * *